Jan. 3, 1950     J. J. FRANK ET AL     2,493,063

SAUSAGE

Original Filed March 4, 1946

INVENTOR.
Joseph J. Frank
BY James C. Macy
John L. Seymour
ATTORNEY.

Patented Jan. 3, 1950

2,493,063

UNITED STATES PATENT OFFICE 2,493,063

SAUSAGE

Joseph J. Frank, Union, and James C. Macy, Elizabeth, N. J., assignors to Hercules Fasteners, Inc., a corporation of New Jersey Continuation of application Serial No. 651,916, filed March 4, 1946. This application filed October 13, 1948, Serial No. 54,346

8 Claims. (Cl. 99—176)

This case is a continuation of allowed application of these inventors Serial No. 651,916, now abandoned.

This invention relates to sausages. It has particular relation to sausage casings and to means and methods of sealing the ends of sausage casings. More broadly, the invention comprehends the sealing of flexible tubular pellicles, particularly those of organic constitution. The invention constitutes a marked improvement in the manufacture of sausages, has particular relation to that art, and will be described in connection therewith, but it is to be understood that this particular description does not limit the invention within its natural scope.

The term "sausage" as employed herein comprehends those meat products which are normally enclosed in a flexible skin or pellicle, thus including not only the small sausages which go by that name in the markets, but the large Bologna and wursts which are customarily sold in slices.

The ingredients employed in the manufacture of such sausages are the meat mixture, a sausage casing, and a length of coarse white twine. The casing, particularly when the large forms of sausage are being made, are customarily tubular regenerated cellulose pellicles of seamless construction which are supplied by the manufacturer in selected, flattened lengths. In preparing the casing for stuffing, a length of the twine is doubled, knotted near the doubled end, the loop so formed being passed over a hook. One end of the casing is pleated, the pleat is laid across the string and a loop knot is pulled down on the pleat, which is then fanned out, and a locking knot is applied across the middle of the fan so that ends of the pleat project outwardly like ears on either side of the locking knot. A third knot is applied over the first locking knot. Three knots are thus necessary to tie the end of the casing, and this procedure goes on until the length of string has been exhausted.

That standard method of tying the end of the sausage casing has many disadvantages: It is unsightly; the string accumulates dirt; the tying is time-consuming; it is physically awkward and produces cuts in the hands of the operator; and the string frequently breaks and delays the operation.

It is an object of this invention to seal the end of a sausage casing in a sanitary manner without the use of string. Another object of the invention is to seal the end of the sausage casing efficiently and permanently by means and methods which are technically and economically superior to those now employed in the meat packing industry. Another object is to seal sausage casings by sanitary means of improved appearance. Another object of the invention is to devise variations on the basic concepts whereby the principles of the invention may be applied with equal facility to different situations.

Another object of the invention is concerned with the problem of sealing tubular containers of the type employed in the manufacture of toothpaste tubes, cosmetic dispensers, and medicine containers. Such tubes are customarily made of metal, of tin when it is available and when its use is warranted, of tin-coated steel, of tin-coated lead, or even of uncoated lead. The use of lead, which is poisonous and contaminates many ingredients, and of other metals has persisted in the face of the development of organic tubular pellicles, despite the superior appearance of organic materials such as regenerated cellulose, vinyl resins, acrylic resins and the like, to a very considerable extent because no satisfactory method of sealing the end of such an organic pellicle had been found. The comparatively simple means by which the end of a metal tube can be sealed has weighed heavily in the minds of those who are engaged in an industry where simplicity in an operation repeated innumerable times upon innumerable tubes becomes of the essence. This invention is believed to furnish the first satisfactory seal for the end of such tubular organic pellicles which can be applied with a simplicity, sightliness, and permanence at least equal, and in most cases superior, to the methods and means which are employed in sealing metal tubes.

It is therefore an object of the invention to seal tubular organic pellicles by means and methods of the utmost simplicity.

The objects of the invention are accomplished generally speaking by pleating the end of a tubular body, gathering the pleats together, applying a metal barrel fastener to the pleated end of the tube and, in the preferred form of the invention, crimping the fastener.

The problems of the invention may be solved to some extent, under some circumstances, by twisting the end of a tube, passing a barrel fastener over the twisted end of the tube, plugging the end of the tube, and sealing the tube by forcing the fastener over the plugged end.

In the drawings, which are for purposes of illustration only, and wherein like numerals refer to like parts, Fig. 1 is a diagrammatic representation of the jaws of a pleating machine designed to produce a preliminary uniform pleat in the end of a sausage casing;

Figure 1:
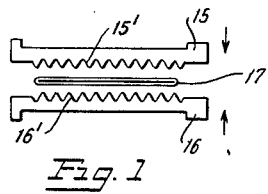

In Fig. 1 the numerals 15 and 16 refer to jaws having offset teeth 15', 16' designed by interfitting to produce a preliminary pleat in the end of a flattened tube 17. These jaws may be satisfactorily operated by means of a treadle, or mechanically by electrical or other power means, if desired.

Figure 2:
Fig. 2 is a view of the end of the sausage casing after treatment by the pleating machine.

In Fig. 2 is shown an enlarged view of the end of a tube which has been pleated by the apparatus shown in Fig. 1. In this figure the numeral 17 refers to the tube and 18 designates the pleats. In carrying out the sealing of the tube end, the pleats are gathered together by the operator as shown at 18 in Fig. 3. When so formed, the pleats are of equal size and present a neat appearance.

Figure 3:
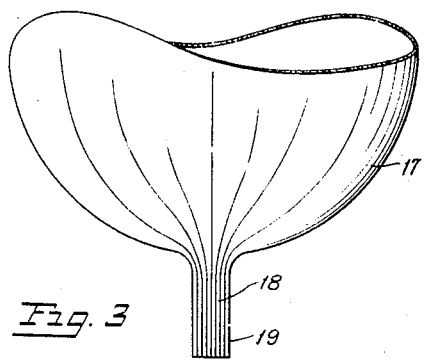
Fig. 3 illustrates the end of the sausage casing with the pleat gathered.
Figure 4:
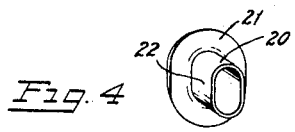
Fig. 4 is a perspective view of a flanged metal barrel fastener adapted to circumscribe the pleat.

In Fig. 4 is shown a fastener of a satisfactory type. This fastener has a tubular barrel portion 20 and a flange 21 projecting at one end therefrom. The fastener is of oblong shape, thus conforming closely to the shape of the pleated end 18 as shown in Fig. 3. The flat sides 22 of the fastener are designed to bear against the flat sides 19 of the pleat. The fasteners may be conveniently made of any material which is capable of being compressed against the pleat with sufficient force to seal it, and which has sufficient rigidity to retain its set under the conditions of temperature and in the media which are employed in the processing of the sausage. Thus, steel, brass, and aluminum fasteners are considered to be satisfactory, but it is to be understood that other metals may be employed. Furthermore, non-metallic substances may be used if they have the requisite properties. Thus, plastic materials may be considered although most of them tend to soften and lose their set under the conditions of temperature and media employed during the cooking of the sausage.

Figure 12:
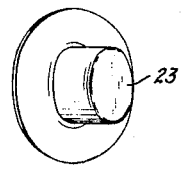
Fig. 12 shows a modified form of fastener.

Round fasteners may also be employed and, as shown in Fig. 12, they need not be perforated at both ends, but may be closed at the outer end 23 as shown in that figure.

Figure 5:
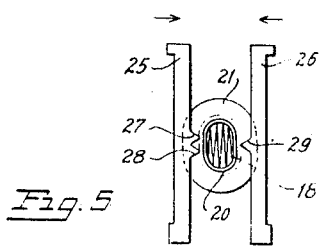
Fig. 5 is a diagrammatic end view of crimping apparatus in operation upon a pleat with fastener in place.

When the fastener has been applied to the pleated end of the casing, it is placed between a pair of jaws 25, 26, as shown in Fig. 5. In a preferred form of the invention these jaws have crimping ridges 27, 28, 29 aligned longitudinally of the casing at right angles to the folds of the pleat, there being two ridges on one side of the fastener and one on the other side, in staggered relation. This arrangement has proved to be peculiarly satisfactory because of an unexpected problem which arose in perfecting the invention.

Figure 6:
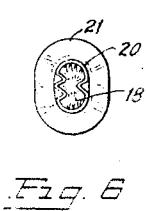
Fig. 6 illustrates the crimped condition of the fastener and pleat after the operation of the crimping machine.

At first, flat pressure jaws 25, 26 were employed, having no crimping ridges, but it was observed that while the inner flanged end of the fastener fitted snugly to the ends of the pleat, the outer edge projected beyond the pleat in points, which raised a problem, not so much in the sealing, as in the processing of the sausage. It is customary to boil many sausages in a single kettle, the sausages frequently receiving treatment therein which is not gentle. It was therefore feared that these small projecting edges might weaken or rip adjacent casings and an attempt was made to develop means of drawing the edges of the crimped barrel close against the ends of the pleat. This was accomplished by the apparatus shown in Fig. 5, by the use of two crimping ridges on one jaw and one on the other. It was discovered when that combination was used that the edge of the fastener fitted the circumference of the pleat snugly at all points, as shown in Fig. 6.

A greater number of crimping ridges may be employed upon the jaws 25, 26 if desired. The number of crimping ridges employed will depend to some extent upon the length of the pleat.

After the end of the casing has been sealed, it is filled through the stuffing horn, sealed at the other end, placed in a kettle with other sausages, and boiled according to the standards required for the cooking of the particular product. Under these circumstances, the casing is not weakened, the seal remains tight, and there is no leakage either into or out of the casing. Because of its appearance, brass constitutes a very satisfactory sealing member. However, other metals may be employed if desired.

Figure 7:
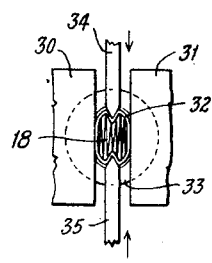
Figs. 7 and 8 show operations that may be usefully employed in a modified form of the process.
Figure 8:
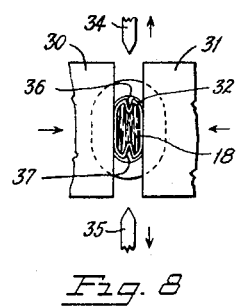

In Figs. 7 and 8 is shown a modification of the invention wherein a round fastener is employed and in which novel apparatus and methods are employed to conform the eyelet to a thick pleat. In these figures 30 and 31 are jaws which may be moved toward and away from each other to compress between them a round fastener 32 having a flange 33. As the jaws 30, 31 engage the sides of the fastener 32, prongs 34, 35 indent the ends of the fastener and are immediately withdrawn. The jaws 30, 31 then complete the compression of the fastener upon the pleat and the forming of the infolds or indentations 36, 37.

This form of the invention thus illustrates the use of a round fastener rather than an oblong one, a different method for conforming the edge of the fastener to the shape of the pleat, the sealing of a pleat by a fastener having uncrimped sides, and the shaping of a fastener to the form of a large pleat.

Figure 9:
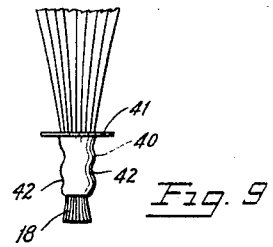
Fig. 9 shows a further modification.

In Fig. 9 is shown the employment of crimps, parallel to the flange of the fastener, which may be produced by the use of jaws such as 25, 26 with ridges properly aligned thereon. In this figure there is a fastener 40, a flange 41, and a plurality of crimps 42 transversely placed with respect to the pleat.

Figure 10:
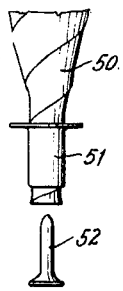
Figs. 10 and 11 show steps of a modified method of sealing the end of a tube.
Figure 11:
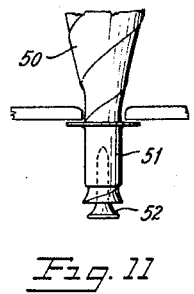

On some occasions, it is desirable that an end of a tube shall be sealed by twisting rather than by accordion pleats such as are shown in Fig. 2. Twisting produces pleats, but they are frequently of unequal size and in coiled relation quite different from accordion pleats. In order to seal such a twisted tube end, we apply over the twisted end 50 of the tube a flanged fastener that is preferably round. This fastener is slid somewhat further up on the twist than is shown in Fig. 10, and a plug 52 is thrust into the end of the twist.

This plug may conveniently be in somewhat the shape of a golf tee, and should be of sufficient diameter to slightly distend the end of the twist. After the plug has been emplaced, the fastener barrel is forced down over it, completing the sealing of the end of the tube by compressing it against the plug. After the seal has been made, the coiled or twisted portion of the tube above the flange may be untwisted and the tube may be filled.

This invention has application not only to sausages, but to the making of cosmetic and toilet containers such as toothpaste and medicine tubes. In the latter field, the invention has particular utility because of packing superiority. Heretofore, substantially all such tubes have been made with a flat end, the corners of which project and make for bad and unsafe packing. The tubes of this invention, on the contrary, are round, have no projecting edges, and lend themselves perfectly to packing.

The casings of our invention are cheaper to make and are superior in quality to the casings made by the standard practices of the prior art. They have improved appearance and can be produced at a higher rate of speed, with fewer failures, and with fewer interruptions of production. They can be produced by women, whereas the manual labor involved in tying sausage casings in the prior art sometimes precluded the employment of women for that purpose.

Other advantages of the invention will be suggested to persons skilled in the art by the specification, or the claims which follow.

As many apparently widely different embodiments of the invention may be made without departing from the spirit and scope of the invention, it is to be understood that we do not limit ourselves to the specific embodiments thereof except as defined in the appended claims.

What is claimed is:

1. The method of sealing a flexible casing that comprises pleating the collapsed end of the casing, passing a barrel fastener over the gathered pleats, and crimping the fastener into firm and sealing contact therewith.

2. The method of sealing a flexible casing that comprises pleating the collapsed end of the casing, passing a flanged metal tube over the gathered pleats, and crimping the tube into firm and sealing contact therewith.

3. The method of preparing a sausage casing that comprises pleating the end of the casing with longitudinal pleats, gathering the pleats together, passing a flanged metal barrel fastener over the pleats, and crimping the fastener upon the pleats with longitudinally aligned crimps.

4. The method of sealing a flexible casing that comprises twisting the end of a flexible casing, passing a barrel fastener over the twisted end, emplacing a plug in the twisted end and moving the fastener into compressive relation to the twisted end and plug.

5. A sausage casing comprising a flexible, elongated, transparent, cellulosic casing having an end longitudinally pleated and sealed by a flanged metal barrel fastener having flat sides bearing against the flat sides of the pleat and having crimps, the outer rim of the fastener being snug against the tube substantially throughout its circumference, and the flange of the fastener serving to protect the material of the casing against cutting by the metal.

6. A sausage casing comprising a flexible, elongated casing having an end longitudinally pleated and sealed by a flanged metal barrel fastener having crimps bearing against the sides of the pleat, the outer rim of the fastener being snug against the casing substantially throughout its circumference.

7. A casing comprising a flexible tubular pellicle having a pleated end sealed by a metal barrel fastener snug against the tube substantially throughout its circumference, and a flared annulus arranged in position to protect the pellicle from damage by the fastener barrel.

8. A sausage comprising a casing having a pleated end sealed by a flanged metal barrel fastener.

JOSEPH J. FRANK.
JAMES C. MACY.

REFERENCES CITED

The following references are of record in the file of this patent:

UNITED STATES PATENTS

| Number | Name | Date |
| --- | --- | --- |
| 2,107,375 | Gookin | Feb. 8, 1938 |
| 2,143,087 | Rau | Jan. 10, 1939 |
| 2,186,435 | Serr | Jan. 9, 1940 |
| 2,240,522 | Serr | May 6, 1941 |